under 35 U.S.C. 154(b) by 0 days.

United States Patent

Wong et al.

(10) Patent No.: US 7,619,209 B2
(45) Date of Patent: Nov. 17, 2009

(54) ENCODER WITH A COMBINED POSITION AND INDEX TRACK

(75) Inventors: Weng Fei Wong, Penang (MY); Chee Foo Lum, Penang (MY); Siang Leong Foo, Penang (MY)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 12/145,434

(22) Filed: Jun. 24, 2008

(65) Prior Publication Data

US 2008/0251700 A1    Oct. 16, 2008

Related U.S. Application Data

(62) Division of application No. 11/595,044, filed on Nov. 9, 2006.

(51) Int. Cl.
*G01D 5/34* (2006.01)
*F21V 9/16* (2006.01)

(52) U.S. Cl. ............................. 250/231.18; 250/237 G (58) Field of Classification Search ............................. 250/231.13–231.18
See application file for complete search history.

(56) References Cited

U.S. PATENT DOCUMENTS

| | | | |
|---|---|---|---|
| 4,451,731 A | 5/1984 | Leonard | |
| 4,691,101 A | 9/1987 | Leonard | |
| 4,866,269 A * | 9/1989 | Wlodarczyk et al. ... | 250/231.18 |
| 5,241,172 A | 8/1993 | Lugaresi | |
| 6,639,207 B2 | 10/2003 | Yamamoto et al. | |
| 2002/0180691 A1 | 12/2002 | Wong et al. | |
| 2005/0088667 A1 | 4/2005 | Yeo | |
| 2005/0133705 A1 | 6/2005 | Hare et al. | |
| 2005/0236560 A1 | 10/2005 | Ch'ng et al. | |
| 2006/0192764 A1 | 8/2006 | Siddiqui | |

FOREIGN PATENT DOCUMENTS

JP    2006/170788    6/2006

\* cited by examiner

*Primary Examiner*—Georgia Y Epps
*Assistant Examiner*—Tony Ko (57) ABSTRACT

An optical encoder. The encoder includes a coding element, an emitter, and a detector. The coding element has a track with a track pattern. The track pattern includes a plurality of optically distinguishable sections, which include a plurality of position sections and an index section. The emitter generates a light signal incident on the track of the coding element. The detector includes a combined position and index photodetector array. The combined position and index photodetector array includes a plurality of position photodetectors and an index photodetector. Embodiments of this type of optical encoder implement position and index sections in a single track on the coding element.

7 Claims, 11 Drawing Sheets

ENCODER WITH A COMBINED POSITION AND INDEX TRACK

CROSS REFERENCE TO RELATED APPLICATIONS

This is a Divisional of co-pending application Ser. No. 11/595,044, filed on Nov. 9, 2006, the entire disclosure of which is incorporated herein by reference.

BACKGROUND OF THE INVENTION

Optical encoders are used to monitor the motion of, for example, a shaft such as a crank shaft. Optical encoders can monitor the motion of a shaft in terms of position and/or number of revolutions of the shaft. Optical encoders typically use a code wheel attached to the shaft to modulate light as the shaft and the code wheel rotate. In a transmissive code wheel, the light is modulated as it passes through transmissive sections of a track on the code wheel. The transmissive sections are separated by non-transmissive sections. In a reflective code wheel, the light is modulated as it is reflected off of reflective sections of the track on the code wheel. The reflective sections are separated by non-reflective sections. As the light is modulated in response to the rotation of the code wheel, a stream of electrical signals is generated from a photodetector array that receives the modulated light. The electrical signals are used to determine the position and/or number of revolutions of the shaft.

Some conventional code wheels include multiple tracks such as separate position and index tracks. These separate tracks on the code wheel are used to determine the rotational position of the shaft, relative to a fixed rotational position, and to determine the number of revolutions of the shaft. The conventional encoders typically have separate photodiode tracks—one for each of the separate position and index tracks. For example, a conventional encoder with three channel outputs includes an AB photodiode track, an index track, and an index/ ("index bar") track. Alternatively, a conventional encoder with three channel outputs may have an AB track and a combined index-index/track. In any case, separate photodiode tracks are implemented for the AB photodiodes and the index-index/photodiodes.

One disadvantage of using separate position and index tracks is that the size of the code wheel may be larger than it would otherwise be if fewer tracks were implemented. The larger size of the code wheel can affect the type of devices in which the code wheel may be used, or the cost of the code wheel, or both. Additionally, the layout of the separate tracks on the code wheel and photodetectors can limit the resolution of the code wheel. Moreover, the task of precisely aligning the separate tracks with the corresponding photodetector arrays becomes more difficult as the number of tracks increases.

SUMMARY OF THE INVENTION

Embodiments of an apparatus are described. In one embodiment, the apparatus includes a coding element, an emitter, and a detector. The coding element has a track with a track pattern. The track pattern includes a plurality of optically distinguishable sections, which include a plurality of position sections and an index section. The emitter generates a light signal incident on the track of the coding element. The detector includes a combined position and index photodetector array. The combined position and index photodetector array includes a plurality of position photodetectors and an index photodetector. Other embodiments of the apparatus are also described.

Embodiments of a system are also described. In one embodiment, the system includes an encoder, a decoder, and a microprocessor. The encoder generates periodic channel signals indicative of movement of a moving part of a device. The encoder includes a coding element coupled to the moving part of the device. The coding element includes a combined position and index track with a track pattern of a plurality of optically distinguishable sections, including a plurality of position sections and an index section. The decoder is coupled to the encoder and generates at least one count signal corresponding to the periodic channel signals. The microprocessor is coupled to the decoder and determines a rotational position and a rotational count of the moving part based on the count signal from the decoder. Other embodiments of the system are also described.

Embodiments of a method are also described. In one embodiment, the method includes generating a light signal incident on the combined position and index track of a coding element, detecting the light signal at an index photodiode after the light signal is applied to the combined position and index track of the coding element, and generating an indexing signal in response to the detected light signal at the index photodetector. The combined position and index track comprises a track pattern of a plurality of optically distinguishable sections, including a plurality of position sections and an index section. Other embodiments of the method are also described.

Other aspects and advantages of embodiments of the present invention will become apparent from the following detailed description, taken in conjunction with the accompanying drawings, illustrated by way of example of the principles of the invention.

DETAILED DESCRIPTION

Figure 1:
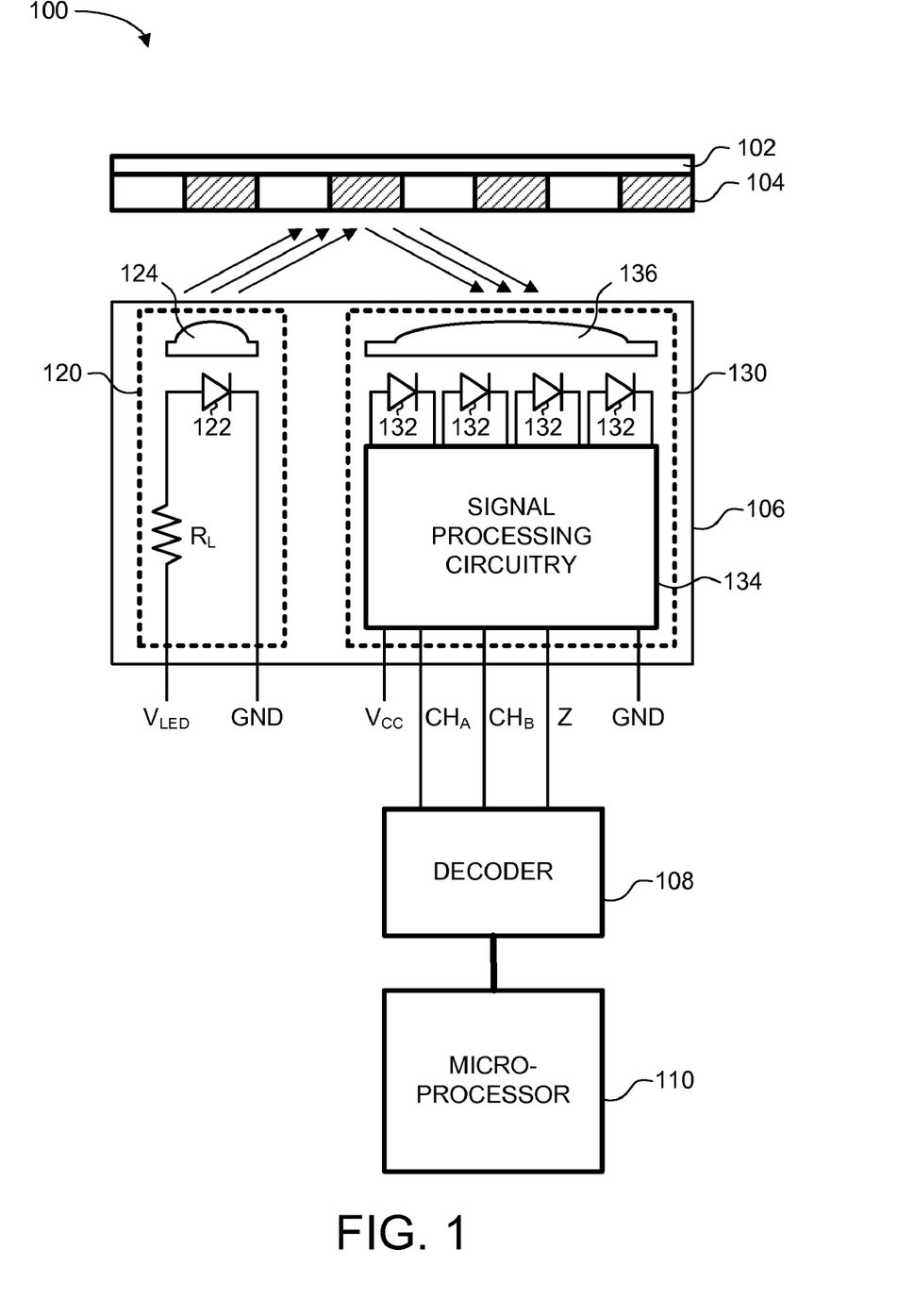
FIG. 1 depicts a schematic circuit diagram of one embodiment of a reflective optical encoding system.

FIG. 1 depicts a schematic circuit diagram of one embodiment of a reflective optical encoding system 100. The illustrated reflective optical encoding system 100 includes a reflective material 102, a code wheel 104, an encoder 106, a decoder 108, and a microprocessor 110. In one embodiment, the reflective material 102 is a coating or a substrate that is physically coupled to the code wheel 104. In some embodiments, the reflective surface of the reflective material 102 is coupled to the code wheel 104 opposite the encoder 106.

Figure 2A:
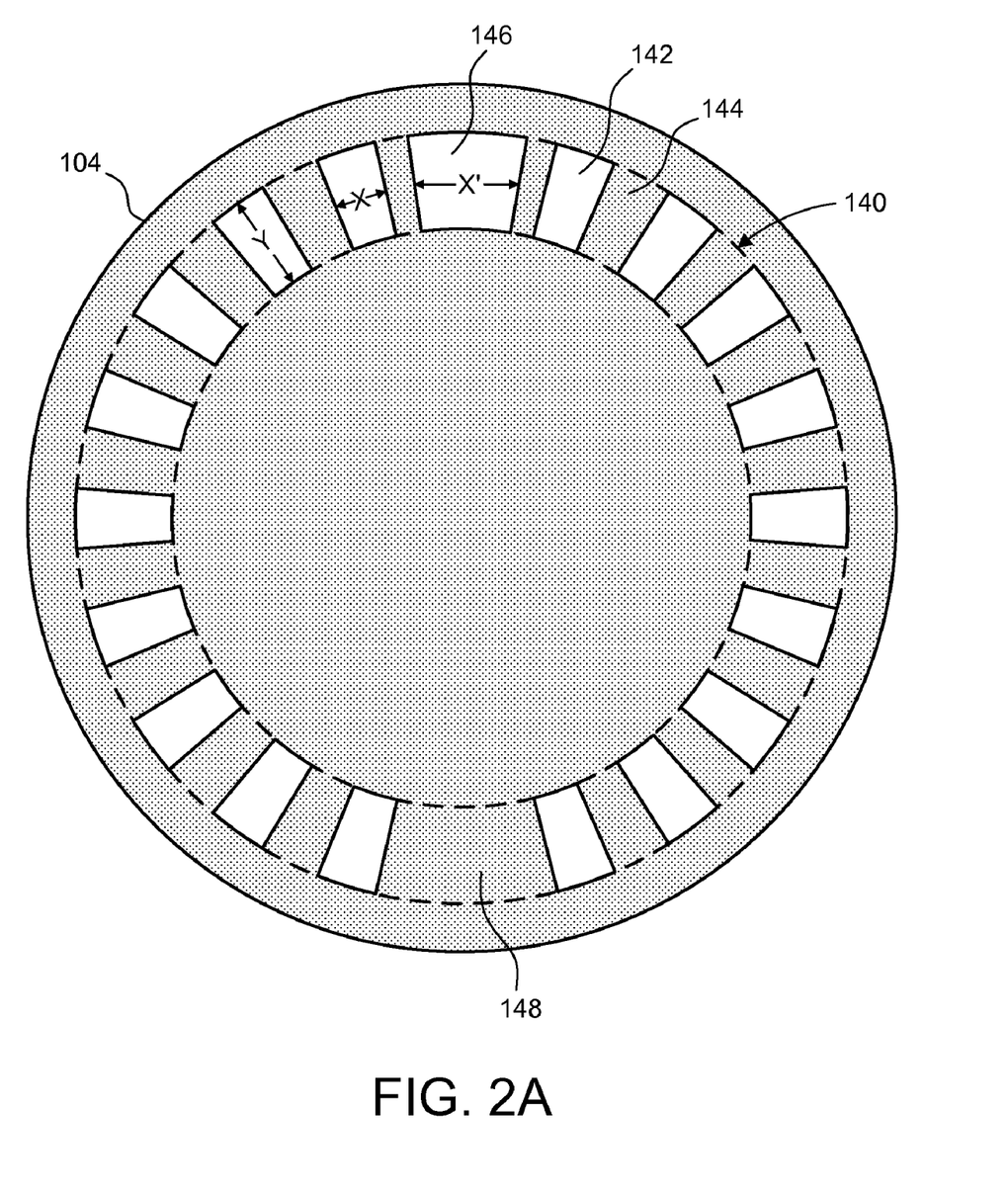
FIG. 2A depicts a schematic diagram of one embodiment of a code wheel with a combined position and index track.

Although a more detailed illustration of the code wheel 104 is provided in FIG. 2A, a brief explanation is provided here as context for the operation of the reflective optical encoding system 100 shown in FIG. 1. In general, the code wheel 104 includes a track 140 of reflective sections 142 and non-reflective sections 144. An emitter 120 in the encoder 106 produces light that is incident on the code wheel track 140. As the code wheel 104 is rotated, for example by a motor shaft (not shown), the incident light is reflected by the reflective sections 142 of the track 140, but is not reflected by the non-reflective sections 144 of the track 140. Thus, the light is reflected by the track 140 in a modulated pattern (i.e., on-off-on-off . . . ). A detector 130 in the encoder 106 detects the modulated, reflected light signal and, in response, generates one or more periodic channel signals (e.g., $CH_A$ and $CH_B$). In one embodiment, these channel signals are then transmitted to the decoder 108, which generates a count signal and transmits the count signal to the microprocessor 110. The microprocessor 110 uses the count signal to evaluate the movement of, for example, the motor shaft or other moving part to which the code wheel 104 is coupled.

In one embodiment, the encoder 106 includes the emitter 120 and the detector 130. The emitter 120 includes a light source 122 such as a light-emitting diode (LED). For convenience, the light source 122 is described herein as an LED, although other light sources, or multiple light sources, may be implemented. In one embodiment, the LED 122 is driven by a driver signal, $V_{LED}$, through a current-limiting resistor, $R_L$. The details of such driver circuits are well-known. Some embodiments of the emitter 120 also may include a lens 124 aligned with the LED 122 to direct the projected light in a particular path or pattern. For example, the lens 124 may focus the light onto the code wheel track 140.

In one embodiment, the detector 130 includes one or more photodetectors 132 such as photodiodes. The photodetectors may be implemented, for example, in an integrated circuit (IC). For convenience, the photodetectors 132 are described herein as photodiodes, although other types of photodetectors may be implemented. In one embodiment, the photodiodes 132 are uniquely configured to detect a specific pattern or wavelength of reflected light. In some embodiments, several photodiodes 132 may be used to detect modulated, reflected light signals from multiple tracks 140, including positional tracks and index tracks, or a combined position and index track. Also, the photodiodes 132 may be arranged in a pattern that corresponds to the radius and design of the code wheel 104. The various patterns of photodiodes 132 are referred to herein as photodetector arrays.

The signals produced by the photodiodes 132 are processed by signal processing circuitry 134 which generates the channel signals, $CH_A$ and $CH_B$. The signal processing circuitry 134 also generates an indexing signal, Z, which may be used to determine the rotational position or the number of rotations of the code wheel 104.

In one embodiment, the detector 130 also includes one or more comparators (not shown) to facilitate generation of the channel signals. For example, analog signals (and their complements) from the photodiodes 132 may be converted by the comparators to transistor-transistor logic (TTL) compatible, digital output signals. In one embodiment, these output channel signals may indicate count and direction information for the modulated, reflected light signal. Additionally, the detector 130 may include a lens 136 to direct the reflected light signal toward the photodiodes 132.

Additional details of emitters, detectors, and optical encoders, generally, may be referenced in U.S. Pat. Nos. 4,451,731, 4,691,101, and 5,241,172, which are incorporated by reference herein.

Figure 2B:
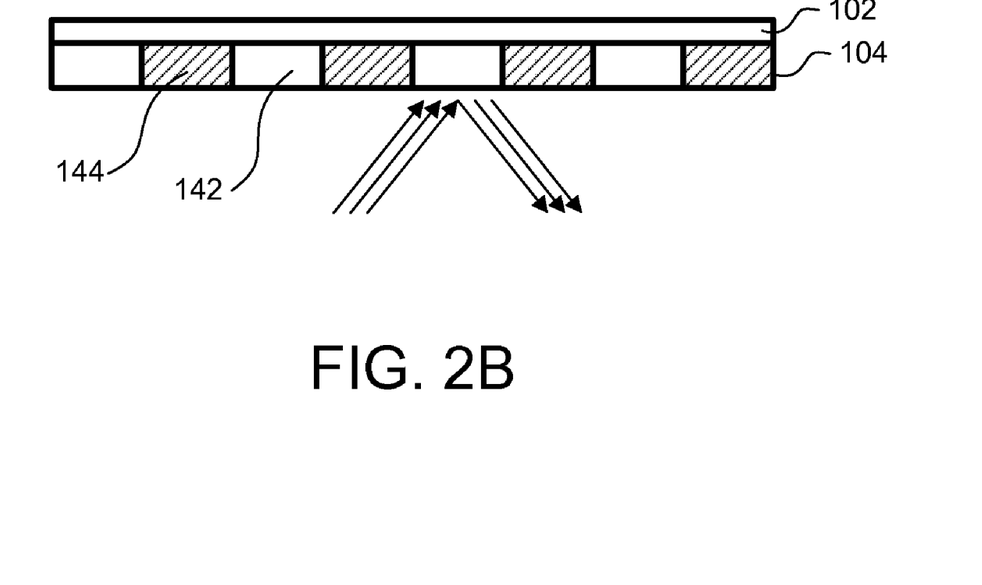
FIGS. 2B and 2C depict schematic diagrams of alternative embodiments of a reflective code wheel.

FIG. 2A depicts a schematic diagram of one embodiment of a code wheel 104 with a combined position and index track 140. In particular, FIG. 2A illustrates a circular code wheel 104 in the shape of a disc. In some embodiments, the code wheel 104 may be in the shape of a ring, rather than a disc. The illustrated code wheel 104 includes a track 140, which may be a circular track that is concentric with the code wheel 104. In one embodiment, the track 140 includes a continuous repeating, or substantially repeating, pattern that goes all the way around the code wheel 104. The depicted pattern includes alternating reflective sections 142 and non-reflective sections 144, although other patterns may be implemented. These reflective sections 142 and non-reflective sections 144 are also referred to as position sections. In one embodiment, the reflective sections 142 are transparent sections of the code wheel 104 with a reflective coating 102 on the opposite side of the code wheel 104, as described above with reference to FIG. 1. In this embodiment, the non-reflective sections 144 may be opaque so that they absorb the light from the LED 122. This embodiment is illustrated in FIG. 2B.

Figure 2C:
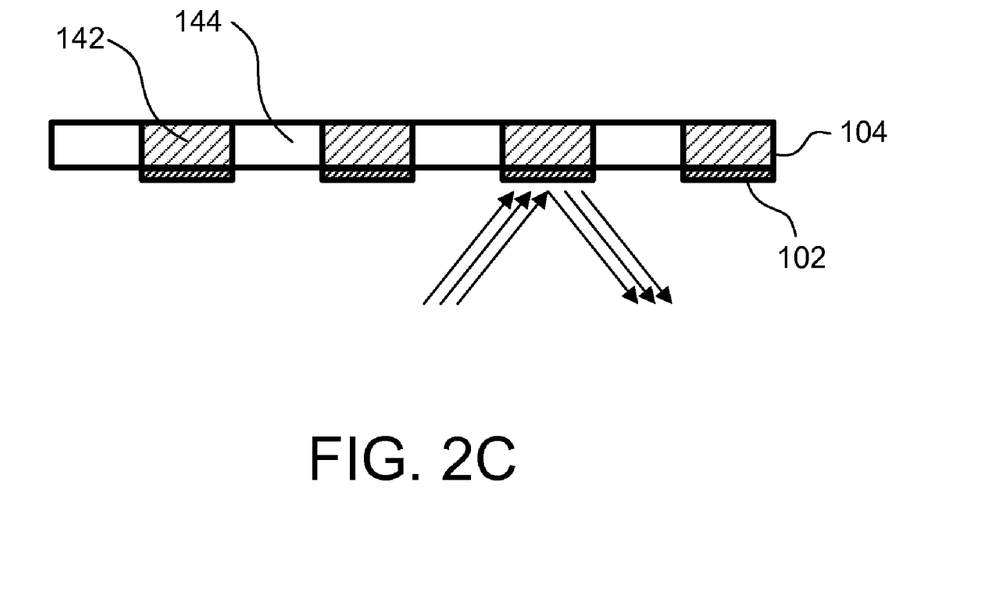

In another embodiment, the reflective sections 142 of the code wheel 104 are reflective spokes of the code wheel 104, and the non-reflective sections 144 are transparent windows or voids (without a reflective coating 103 on the opposite side of the windows or voids. In this embodiment, the entire code wheel 104 may have a reflective material 102 applied to the near surface. This embodiment is illustrated in FIG. 2C.

As described above, rotation of the code wheel 104 and, hence, the track 140 results in modulation of the reflected light signal at the detector 130 to measure rotational changes of the code wheel 104. Other embodiments of the code wheel 104 may include other tracks such as additional position tracks, as are known in the art.

In the depicted embodiment, the position track sections 142 and 144 have the same circumferential dimensions (also referred to as the width dimension, as indicated by the span "x"). In other words, the intermediate non-reflective track sections 144 have the same width dimension as the reflective track sections 142. The resolution of the code wheel 104 is a function of the width dimensions of the positional track sections 142 and 144. In one embodiment, the width dimensions of the non-reflective track sections 144 are a function of the amount of area required to produce a detectable gap between consecutive, reflected light pulses. The radial, or height, dimensions (as indicated by the span "y") of the reflective track sections 142 are a function of the amount of area required to generate a sufficient amount of photocurrent (e.g., the more photocurrent that is required, the larger the area required and, hence, the larger "y" needs to be since area equals "x" times "y").

In addition to the illustrated position sections 142 and 144, the code wheel 104 also includes an index section 146. In one embodiment, the index section 146 has a greater width dimension (as indicated by the span "x") than the position sections 142 and 144. For example, the index section 146 may have a width that is twice the width of the position track sections 142 and 144 (i.e., the same as the combined width of a reflective track section 142 and a non-reflective track section 144). Other embodiments may implement different widths for the index section 146.

The illustrated code wheel 104 also includes an index-bar section 148. The index-bar section 148 is similar to the index section 146, except that the index-bar section 148 is non-reflective (e.g., opaque). In one embodiment, the index-bar section 148 is diametrically opposed to the index section 146 within the track 140. Alternatively, the index and index-bar sections 146 and 148 may be located in different positions within the track 140, or may have different height and width dimensions. Additionally, although the depicted code wheel 104 includes one index section 146 and one index-bar section 148, other embodiments of the code wheel 104 may include another number of index and index-bar sections 146 and 148. Furthermore, it should be noted that the terms "index section" and "index-bar section" are arbitrarily assigned with respect to the reflective and non-reflective sections 146 and 148. For convenience, the description herein uses a convention in which the index section 146 is a reflective section of the reflective code wheel 104, and the index-bar section 148 is a non-reflective section of the reflective code wheel 104. However, other embodiments may implement a non-reflective index section 146 or a reflective index-bar section 148 in a reflective code wheel 104.

Moreover, the index and index-bar sections 146 and 148 are located within the same track 140 as the position sections 142 and 144. Hence, this type of code wheel 104 with a combined position and index track 140 may be referred to as a three-channel, single-track code wheel 104. By including the index and index-bar sections 146 and 148 in the same track 140 as the position sections 142 and 144, the overall size of the code wheel 104 may be reduced compared to a conventional code wheel which includes two or more separate tracks for position and index sections. Furthermore, other embodiments of the code wheel 104 may implement more than one index section 146 or more than one index-bar section 148. Where multiple index and index-bar sections 146 and 148 are implemented, the encoder 106 may be referred to as a pseudo-absolute encoder.

Figure 3:
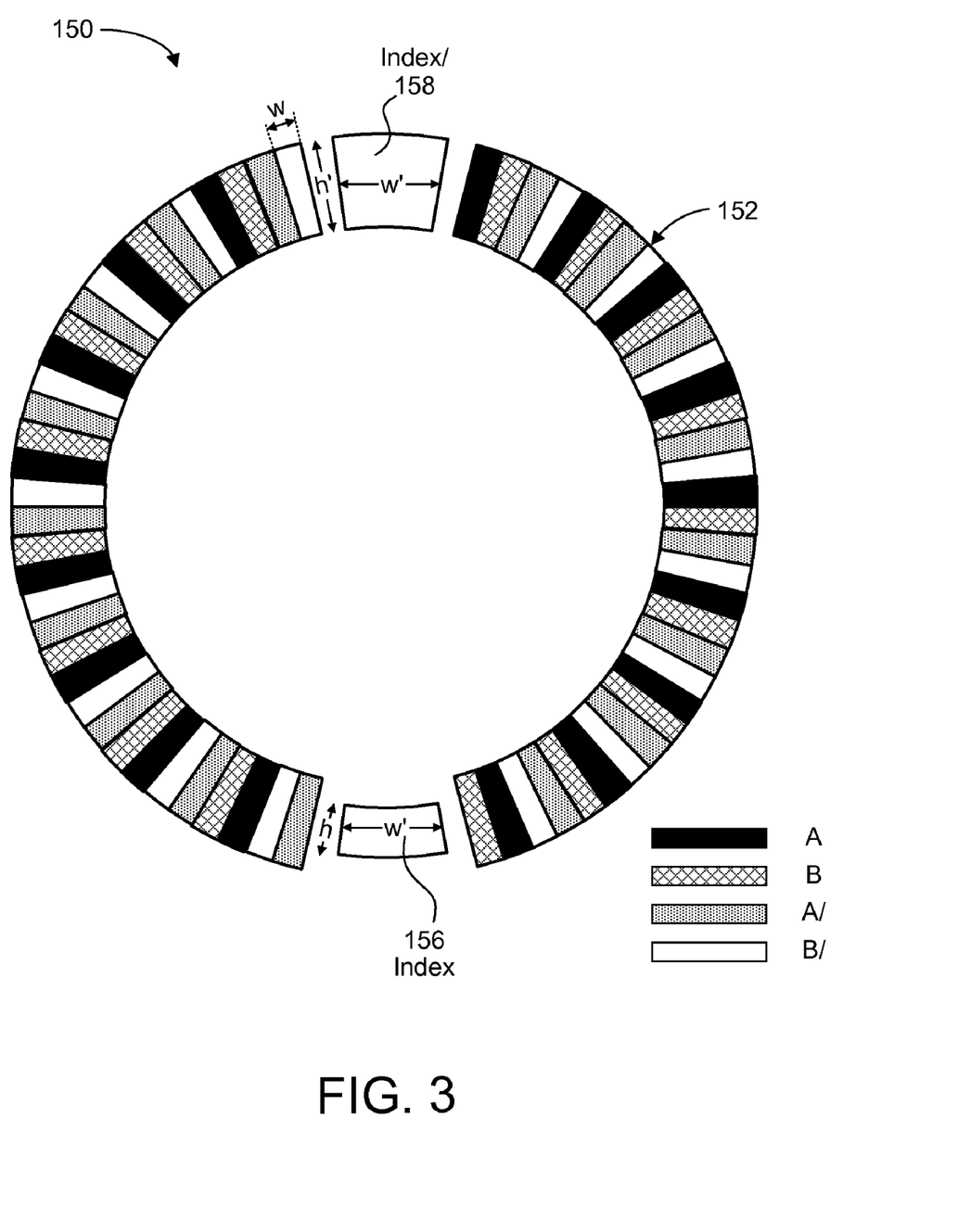
FIG. 3 depicts a schematic layout of one embodiment of a combined position and index photodetector array.

FIG. 3 depicts a schematic layout of one embodiment of a combined position and index photodetector array 150. The illustrated photodetector array 150 includes several position photodetectors 152, including A-signal photodetectors to generate one or more A signals, B-signal photodetectors to generate one or more B signals, A/-signal photodetectors to generate one or more A/signals, and B/-signal photodetectors to generate one or more B/signals. For clarification, "A/" is read as "A bar" and "B/" is read as "B bar." (Similarly, "index-bar" may be written as "index/" or "I/.") This designation of the position photodetectors 152 and the corresponding electrical signals that are generated by the position photodetectors 152 is well-known in the art. The circumferential dimensions (also referred to as the width dimensions, indicated by the span "w") of the position photodetectors 152 are related to the width dimensions of the position track sections 142 and 144 of the corresponding code wheel track 140. In the embodiment of FIG. 3, each positional photodetector 152 has a width that is one half the width of the reflective and non-reflective track sections 142 and 144 of the corresponding position track 140 (i.e., "w" equals "x/2").

It should be noted that the geometrical dimensions of the position photodetectors 152 and other photodetectors may be referenced to the corresponding optical sizes of the position track sections 142 and 144 of the track 140. For example, optical magnification may be used to optically match the sizes of the photodiodes and the track sections. In one embodiment, the optical magnification is approximately 2× so that a geometrically smaller code wheel 104 is optically matched to a larger photodetector array 150.

In one embodiment, the signals from each group of position photodetectors 152 may be averaged together or otherwise combined to result in a single output signal for each of the corresponding groups. For example, the A signals may be combined, the B signals may be combined, the A/signals may be combined, and the B/signals may be combined.

The illustrated photodetector array 150 also includes an index photodetector 156 and an index-bar photodetector 158. Since the index and index-bar photodetectors 156 and 158 are located in the same ring formation as the position photodetectors 152, this type of photodetector array 150 with a combined ring of position and indexing photodetectors 152, 154, and 156 may be referred to as a three-channel, single-track photodetector array 150. By implementing the photodetector array 150 in a ring formation, as shown, the photodiode array 150 can simultaneously "see" the entire track 140 of the code wheel 104, whereas conventional photodiode arrays typically only see a portion of the track 140. In one embodiment, the index and index-bar photodetectors 156 and 158 are diametrically opposed in the ring formation of the photodetector array 150. Alternatively, the index and index-bar photodiodes 156 and 158 may be arranged in a configuration that is not diametrically opposed. Furthermore, other embodiments of the photodetector array 150 may implement more than one index photodetector 156 or more than one index-bar photodetector 158, in order to match the number of index and index-bar sections 146 and 148 of the code wheel 104. Other embodiments may implement a single index photodetector 156 and a single index-bar photodetector 158, although the code wheel 104 may have more than one index section 146 or more than one index-bar section 148.

The index photodetector 156 generates an index output signal, and the index-bar photodetector 158 generates an index-bar output signal. In one embodiment, the index and index-bar photodetectors 156 and 158 have width dimensions (indicated by the span "w") that are twice the width of the position sections 142 and 144 (i.e., the same as the combined width of a reflective track section 142 and a non-reflective track section 144), in which case the width of the index and index-bar photodetectors 156 and 158 would be four times the width of each of the position photodetectors 152 (i.e., "w" equals "4w"). In some embodiments, the index and index-bar output signals are used to generate an indexing signal, Z, which may be used to determine a rotational position of the code wheel 104. The indexing signal, Z, also may be used to determine a number of rotations the code wheel 104.

The height dimensions (indicated by the "h" and "h") of the index and index-bar photodetectors 156 and 158 are indicated. In one embodiment, the height dimension of the index photodetector 156 is less than the height dimensions of the position photodetectors 152, and the height dimension of the index-bar photodetector 158 is the same as the height dimension of the index photodetector 156. However, other embodiments may implement other combinations of height dimensions. In one embodiment, the height dimensions of the index and index-bar photodetectors 156 and 158 are implemented so that the index and index-bar output signals may be compared to each other to determine the indexing signal, Z. In one embodiment, the height dimension of the index-bar photodetector 158 is twice the height dimension of the index photodetector 156 (i.e., "h" equals "2h"). However, other embodiments may implement other relative height and width dimensions. For example, some embodiments may implement an index photodetector 156 with more surface area and, hence, capable of producing a higher index output signal than the index-bar photodetector 158.

Figure 4:
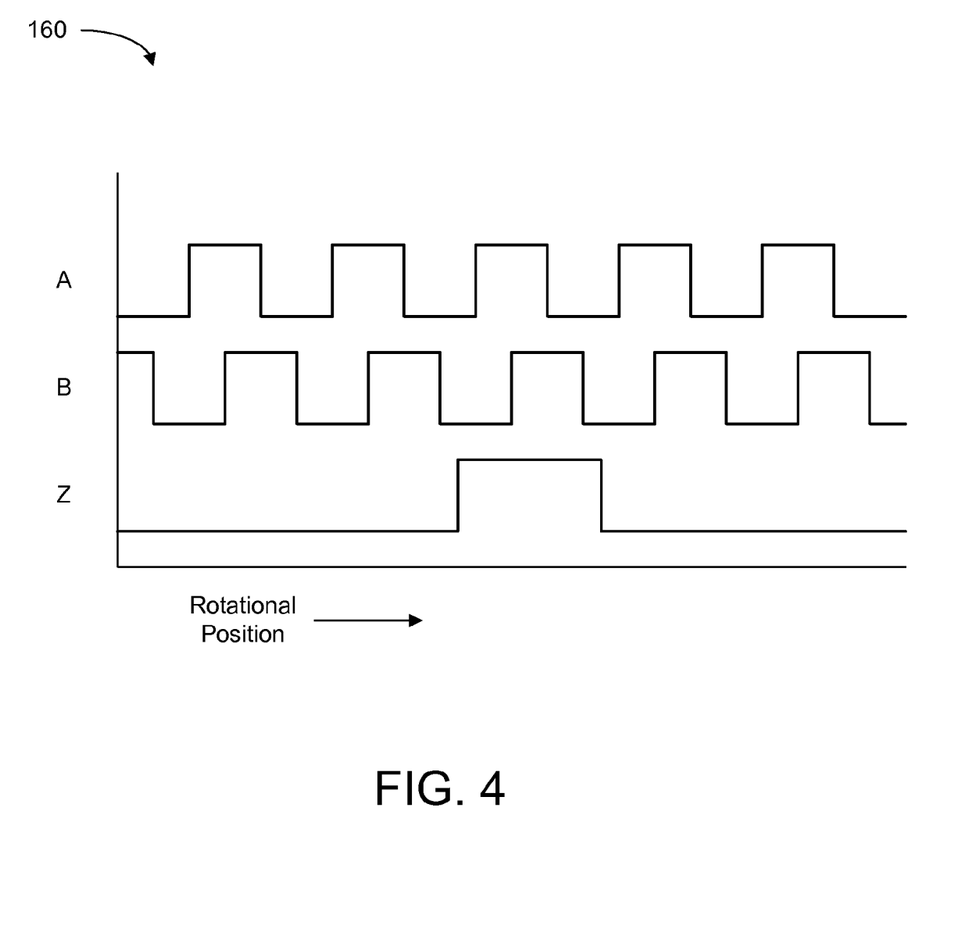
FIG. 4 depicts a wave diagram of digital signals generated by the encoder as the track moves relative to the photodetector array.

FIG. 4 depicts a wave diagram 160 of digital signals generated by the encoder 106 as the track 140 moves relative to the photodetector array 150. In particular, the illustrated wave diagram 160 shows exemplary digital signals produced by the detector 130 as the track 140 rotates. Specifically, an A signal, a B signal, and an indexing signal, Z, are shown. However, other embodiments may vary from the illustrated embodiment, depending on the resolution of the code wheel 104, the locations of the index and index-bar sections 146 and 148 in the track 140, and so forth.

In one embodiment, the logical state (e.g., HIGH or LOW) of the indexing signal, Z, depends on the relative locations of the index and index-bar photodetectors 156 and 158 to the position, index, and index-bar sections 142, 144, 146, and 148 of the track 140. Three exemplary configurations are shown and described in more detail with reference to the following figures. The position signals (e.g., the A and B signals) also may be affected by the relative locations of the position photodetectors 152 to the position, index, and index-bar sections 142, 144, 146, and 148 of the track 140. In one embodiment, the potentially interruptive effects of the index and index-bar sections 146 and 148 on the position signals are mitigated by having a plurality of each group of position photodetectors 152 and combining (e.g., averaging) the output signals so that the individual discontinuities are essentially masked.

Figure 5A:
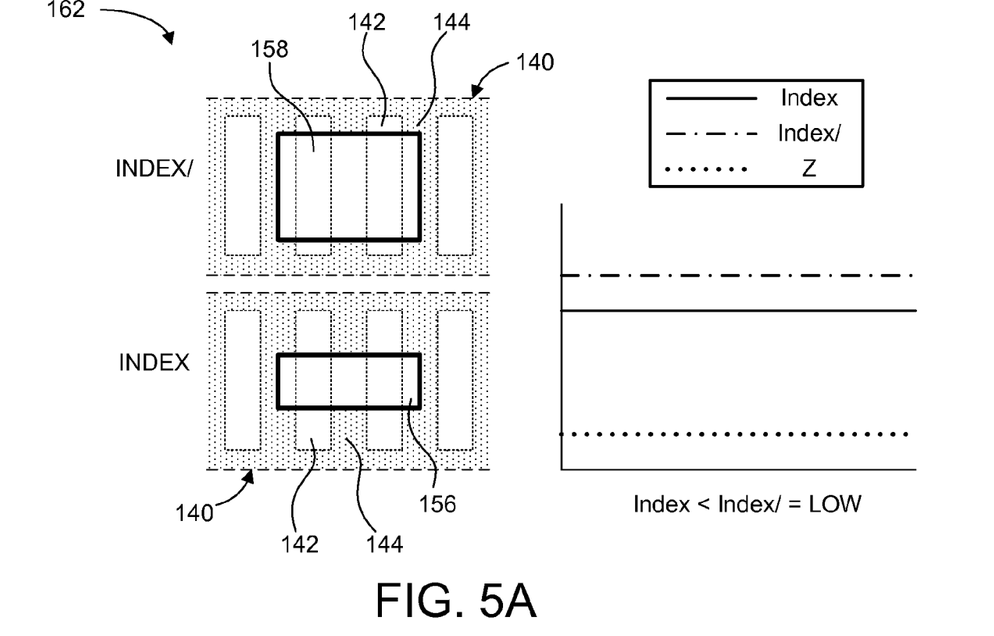
FIG. 5A depicts exemplary positions of the index and index/photodetectors relative to the positional sections of the combined position and index track to produce a logical LOW indexing signal.
Figure 5B:
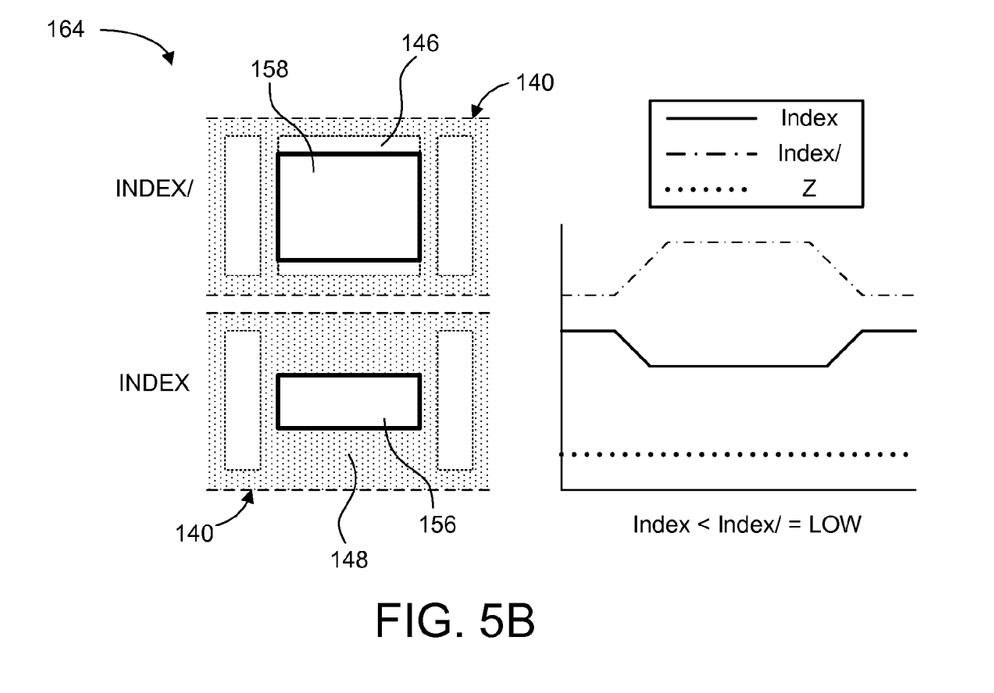
FIG. 5B depicts exemplary positions of the index and index/photodetectors relative to the indexing sections of the combined position and index track to produce a logical LOW indexing signal.
Figure 5C:
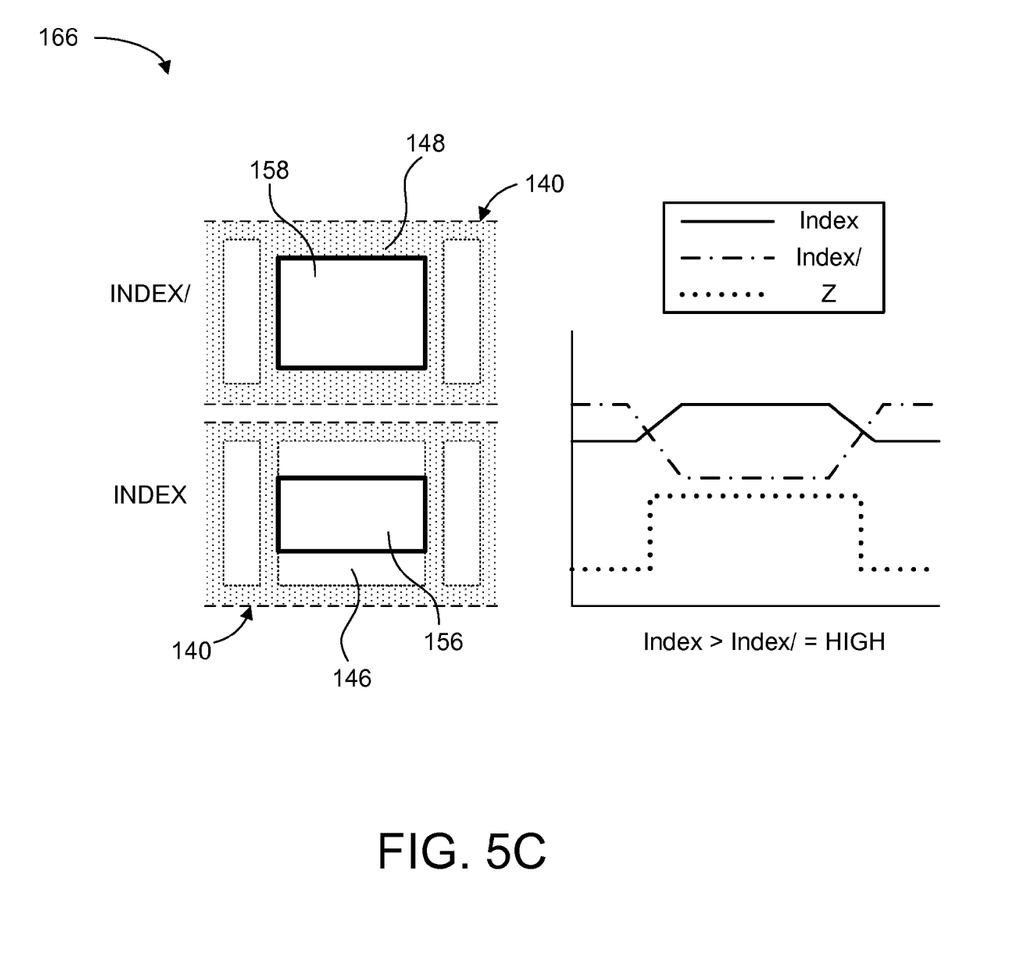
FIG. 5C depicts exemplary positions of the index and index/photodetectors relative to the indexing sections of the combined position and index track to produce a logical HIGH indexing signal.

In the following figures, the track 140, index photodetector 156, and index-bar photodetector 158 are shown in a substantially linear arrangement. This depiction is for convenience in illustrating the positions of the track sections 142, 144, 146, and 148 relative to the index and index-bar photodetectors 156 and 158.

FIG. 5A depicts exemplary positions of the index and index-bar photodetectors 156 and 158 relative to the position sections 142 and 144 of the combined position and index track 140 to produce a logical LOW indexing signal. In particular, as the position sections 142 and 144 of the track 140 pass the index photodetector 156, the index photodetector 156 generates an index output signal relative to the amount of surface area that is illuminated by the light signal reflected from the reflective sections 142 of the track 140. Similarly, the index-bar 158 generates an index-bar output signal relative to the amount of surface area that is illuminated by the reflected light signal. Given that the total surface area of the index photodetector 156 is less than the surface area of the index-bar photodetector 158, the index output signal is lower than the index-bar signal. In one embodiment, the indexing signal, Z, is output as a logical LOW signal when the index output signal is lower than the index-bar output signal.

FIG. 5B depicts exemplary positions of the index and index-bar photodetectors 156 and 158 relative to the indexing sections 146 and 148 of the combined position and index track 140 to produce a logical LOW index signal. In particular, the index photodetector 156 generates a lower index output signal as the index-bar section 148 of the track 140 passes the index photodetector 156. In contrast, the index-bar photodetector 158 generates a higher index-bar output signal as the index section 146 of the track 140 passes the index-bar photodetector 158. Once again, the indexing signal, Z, is output as a logical LOW signal when the index output signal is lower than the index-bar output signal.

FIG. 5C depicts exemplary positions of the index and index-bar photodetectors 156 and 158 relative to the indexing sections 146 and 148 of the combined position and index track 140 to produce a logical HIGH index signal. In particular, the index photodetector 156 generates a higher index output signal as the index section 146 of the track 140 passes the index photodetector 156. In contrast, the index-bar photodetector 158 generates a lower index-bar output signal as the index-bar section 148 of the track 140 passes the index-bar photodetector 158. In this configuration, the indexing signal, Z, is output as a logical HIGH signal when the index output signal is higher than the index-bar output signal.

In one embodiment, a comparator (not shown) is used to compare the index and index-bar output signals. Additionally, the relative timing of the rise or fall of the index and index-bar output signals may be determined based on the relative dimensions of the indexing sections 146 and 148, the relative dimensions of the indexing photodetectors 156 and 158, the electrical paths of the processing circuitry 134, and so forth. Also, errors and tolerances may affect the relative timing of the index and index-bar output signals. In some embodiments, the indexing signal may be a logical HIGH when the index signal is lower than the index-bar signal, as opposed to the embodiments described above. In general, the assignment of HIGH and LOW states is a convention that may be implemented in different ways within different optical encoders 106.

Figure 6:
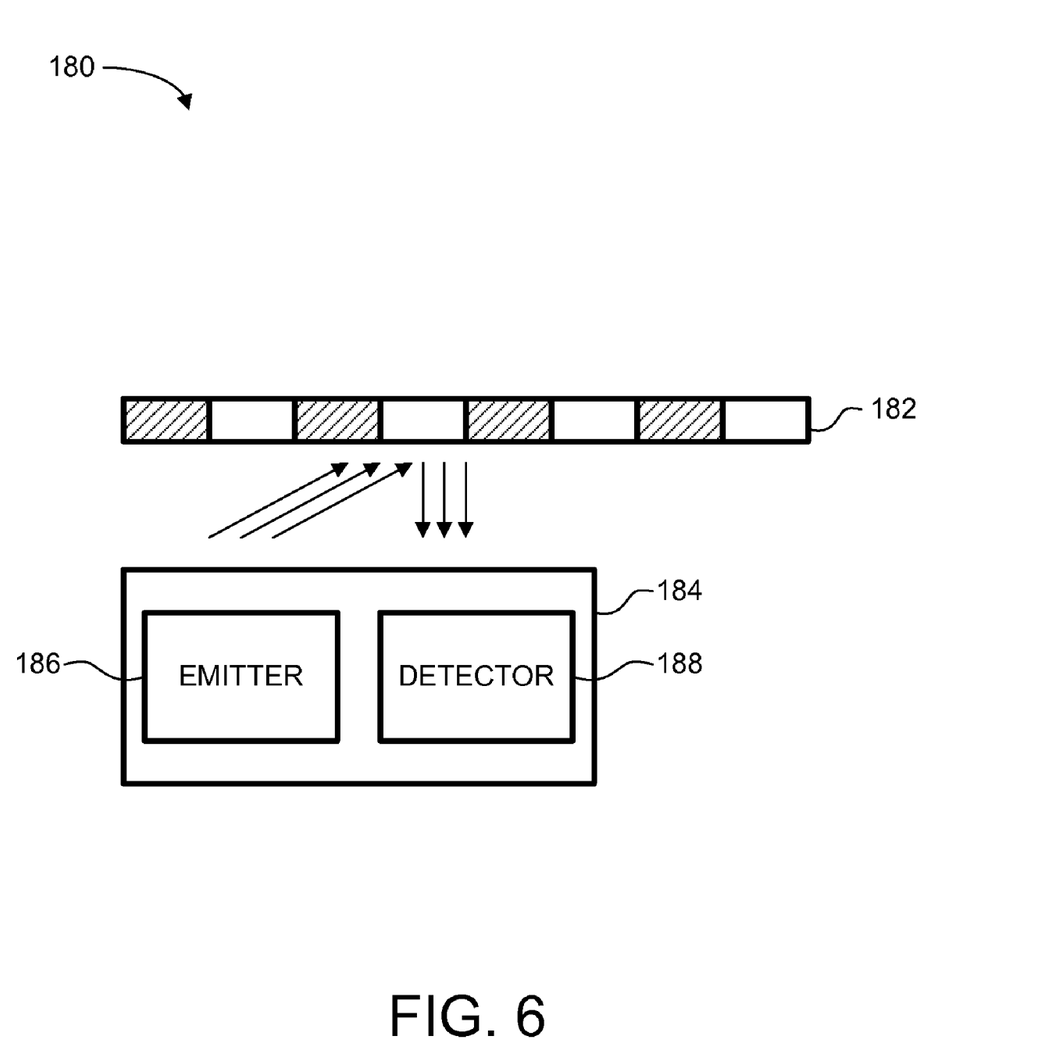
FIG. 6 depicts a schematic diagram of one embodiment of an imaging encoding system.

FIG. 6 depicts a schematic diagram of one embodiment of an imaging encoding system 180. The illustrated imaging encoding system 180 includes an imaging coding element 182, for example, an imaging code wheel. The functionality of the imaging code wheel 182 is substantially similar to the functionality of the reflective code wheel 104, described above, except that the imaging code wheel 182 does not necessarily have a reflective material 102 applied to the opposite side of the code wheel 182.

In some aspects, the imaging encoder 184 operates similarly to the encoder 106 described above. The imaging encoder 184 includes an emitter 186 and a detector 188. However, in contrast to the reflective optical encoding system 100 of FIG. 1, the imaging encoding system 180 differentiates between different track sections on the imaging code wheel 182 based on how the light bounces back from the non-absorptive pattern on the code wheel 182. In particular, the detector 188 detects the diffuse portion of the light, rather than a reflected portion. Additional details of at least one embodiment of an imaging encoding system 180 are described in U.S. Pat. No. 7,102,123, which is incorporated by reference herein.

Figure 7:
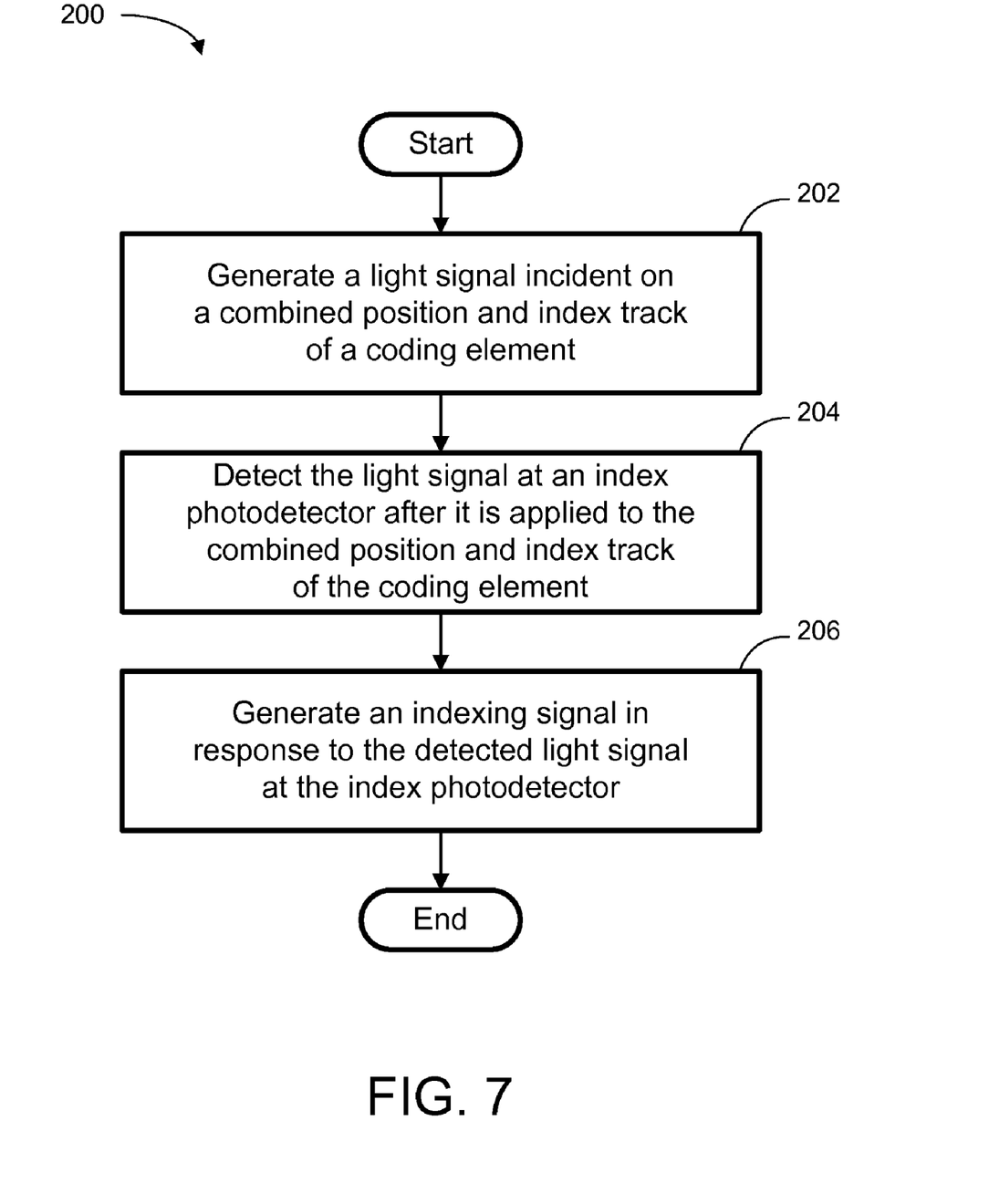
FIG. 7 depicts a process flow diagram of one embodiment of a method of operation for an encoder with a combined position and index track.

FIG. 7 depicts a process flow diagram of one embodiment of a method 200 of operation for an encoder 106 with a combined position and index track 140. As an example, an encoder 106 with a combined position and index track 140 may be operated in conjunction with a motor shaft 184, although the encoder 106 may be operated in conjunction with other devices which exhibit rotational or linear motion.

At block 202, a light signal is generated and incident on the combined position and index track 140 of the coding element. In one embodiment, the light signal originates from one or more LEDs 122. At block 204, the light signal is detected after it has been applied to the coding element. As used in this context, the term "applied" means reflected by the reflective coding element. In one embodiment, the index photodetector 156 (and/or the index-bar photodetector 158) detects the reflected light signal. At block 206, the encoder 106 generates an indexing signal, Z, in response to the detected light signal at the index photodetector 156. The depicted method 200 then ends.

Figure 8A:
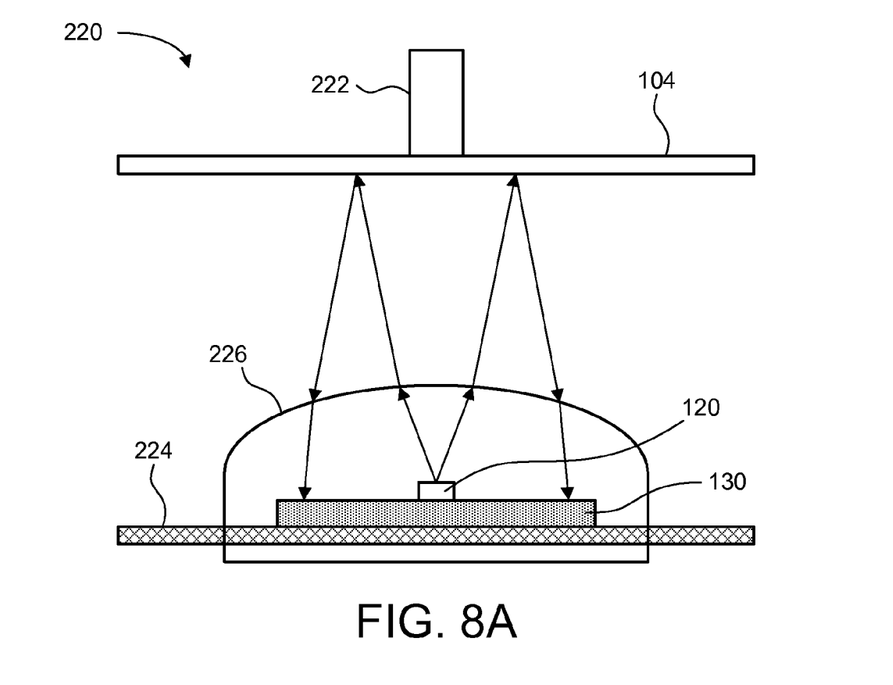
FIGS. 8A-C depict schematic diagrams of various embodiments of encoder packages.
Figure 8B:
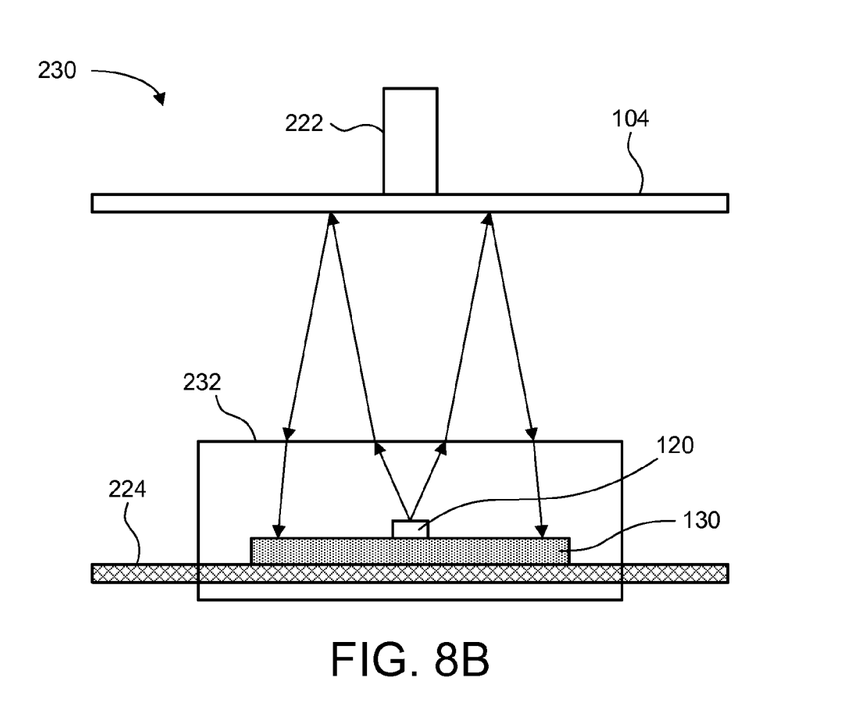
Figure 8C:
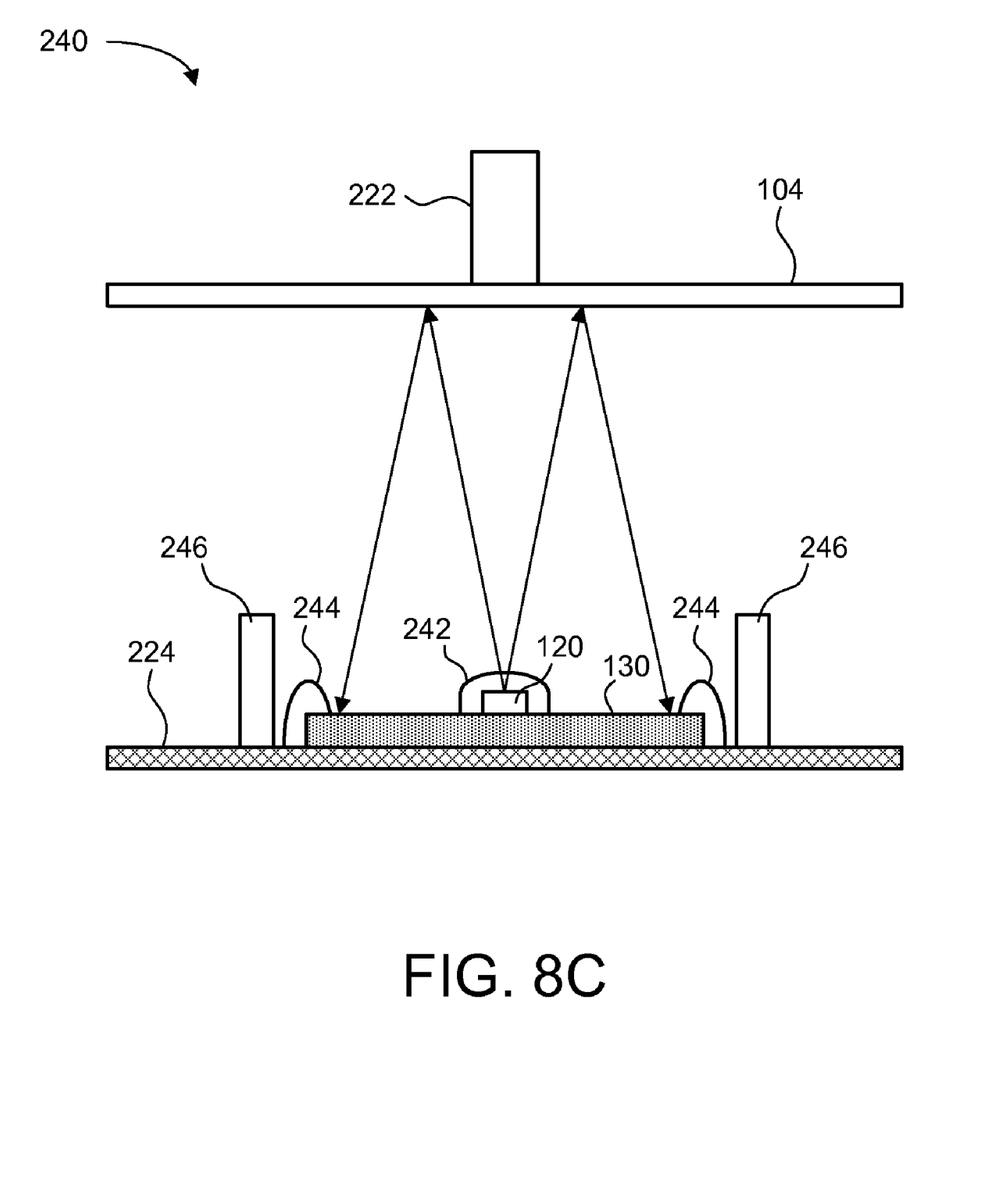

FIGS. 8A-C depict schematic diagrams of various embodiments of encoder packages. In particular, FIG. 8A illustrates one embodiment of an encoder 220 with a code wheel 104 coupled to a motor shaft 222, so that the code wheel 104 rotates with the motor shaft 222. The emitter 120 and detector 130 are disposed on a substrate 224 beneath the code wheel 104. In one embodiment, the emitter 120 and detector 130 are encapsulated together by an encapsulant 226, which forms a convex lens above the dice. One example of the encapsulant 226 is an epoxy, although other types of encapsulants may be used. The encoder 230 of FIG. 8B is substantially similar to the encoder 220 of FIG. 8A, except the encoder 230 of FIG. 8B has an encapsulant 232 which forms a flat lens above the emitter 120 and the detector 130. The encoder 240 of FIG. 8C has separate encapsulants 242 and 244 to cover the wirebonds of the emitter 120 and the detector 130. In one embodiment, the dice themselves are not encapsulated, except to the extent that they wirebond encapsulants 242 and 244 cover the dice. This type of encoder package 240 may be referred to as an air-gap package. The encoder 240 also includes stand-off structures 246 on either side of the emitter 120 and detector 130. Other types of encoders also may be implemented.

Embodiments of a code wheel with a combined position and index track as described herein may be used in various types of systems. One embodiment provides improved tolerance to misalignment. For example, a code wheel 104 with a combined position and index track 140 may function with more than ten percent misalignment of optical radius without degradation in electrical performance. Another embodiment provides improved tolerance to tangential misalignment and tilt. Another embodiment may have reduced position error due to eccentricity of the code wheel pattern relative to the photodiode array. For example, the ring configuration of the photodiode array may compensate for the position error. Another embodiment enables a smaller encoder footprint which may be used with motors which have smaller diameters.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A system to detect motion of a device, the system comprising:
    an encoder configured to generate periodic channel signals indicative of movement of a moving part of the device, the encoder comprising:
        a coding element coupled to the moving part of the device, the coding element comprising a combined position and index track with a track pattern of a plurality of optically distinguishable sections, wherein the plurality of optically distinguishable sections comprises a plurality of position sections, an index section, and an index-bar section;
        an index photodiode to generate an index output signal corresponding to the index section of the coding element; and
        an index-bar photodiode to generate an index-bar output signal corresponding to the index section of the coding element;
    a decoder coupled to the encoder, the decoder to generate at least one count signal corresponding to the periodic channel signals; and
    a microprocessor coupled to the decoder, the microprocessor to determine a rotational position and a rotational count of the moving part based on the at least one count signal from the decoder.

2. The system of claim 1 wherein the periodic channel signals comprise:
    a first channel signal associated with a first type of the plurality of position sections of the combined position and index track;
    a second channel signal associated with a second type of the plurality of position sections of the combined position and index track; and
    an indexing signal associated with the index section of the combined position and index track.

3. The system of claim 2 wherein the encoder further comprises signal processing circuitry to generate the indexing signal associated with the index section of the combined position and index track.

4. The system of claim 3 wherein the signal processing circuitry is configured to generate a logical LOW indexing signal in response to a determination that an index output signal is lower than an index-bar output signal, and to generate a logical HIGH indexing signal in response to a determination that the index output signal is higher than the index-bar output signal.

5. The system of claim 4 wherein the encoder further comprises:
    a light source to generate a light signal incident on the combined position and index track of the coding element; and
    a photodetector array comprising a plurality of photodiodes to detect the light signal from the combined position and index track of the coding element, wherein the plurality of photodiodes comprises:
        an A-signal photodiode to generate an A signal;
        a B-signal photodiode adjacent to the A-signal photodiode, the B-signal photodiode to generate a B signal;
        an A-bar photodiode to generate an A-bar signal;
        a B-bar photodiode adjacent to the A-bar photodiode, the B-bar photodiode to generate a B-bar signal;
        the index photodiode to generate the index output signal; and
        the index-bar photodiode to generate the index-bar output signal.

6. The method of claim 1 wherein the index section of the coding element is optically distinguishable from the plurality of position sections and the index-bar section of the coding element.

7. The method of claim 1 wherein the index-bar section of the coding element is optically distinguishable from the plurality of position sections and the index section of the coding element.

* * * * *